United States Patent [19]

Bowsky et al.

[11] Patent Number: 4,707,424

[45] Date of Patent: Nov. 17, 1987

[54] TERMINAL PIN AND END CLOSURE STRUCTURE FOR CHAMBER DEFINING HOUSING OF HERMETIC TERMINAL ASSEMBLY AND METHOD OF MANUFACTURE

[75] Inventors: Benjamin Bowsky, Maineville; Glenn A. Honkomp, Loveland; Larry G. Burrows, Cincinnati; Edward E. Wilson, Milford, all of Ohio

[73] Assignee: Emerson Electric Co., St. Louis, Mo.

[21] Appl. No.: 909,301

[22] Filed: Sep. 19, 1986

[51] Int. Cl.$^4$ .............................................. H01M 2/30
[52] U.S. Cl. .................................... 429/181; 429/185; 174/50.61; 174/152 GM
[58] Field of Search ............... 429/174, 175, 178, 180, 429/181, 185; 174/50.61, 152 GM; 29/630, 837

[56] References Cited

U.S. PATENT DOCUMENTS

| | | | |
|---|---|---|---|
| 4,047,292 | 9/1977 | Shaffer | 429/181 X |
| 4,233,372 | 11/1980 | Bro et al. | 429/174 |
| 4,279,975 | 7/1981 | Bowsky | 429/181 |
| 4,358,514 | 11/1982 | Garoutte et al. | 429/181 |
| 4,486,514 | 12/1984 | Chaney, Jr. | 429/181 X |
| 4,603,095 | 7/1986 | Bowsky | 429/181 |

Primary Examiner—Anthony Skapars
Attorney, Agent, or Firm—Polster, Polster and Lucchesi

[57] ABSTRACT

A modified terminal pin and end closure structure for the housing of a hermetic terminal assembly and method of manufacturing the same, the structure including an apertured end closure with a peripheral wall surrounding the aperture and extending into the housing with the free end of the wall cooperatively overlapped in aperture sealing relation by a terminal pin carrying eyelet.

10 Claims, 3 Drawing Figures

TERMINAL PIN AND END CLOSURE STRUCTURE FOR CHAMBER DEFINING HOUSING OF HERMETIC TERMINAL ASSEMBLY AND METHOD OF MANUFACTURE

BACKGROUND OF THE INVENTION

The present invention relates to hermetic terminal assembly structure and a method of making the same and particularly to a modified end closure structure for the chamber defining housing of an hermetic terminal assembly, the end closure having an aperture therein to provide for a terminal pin carrying eyelet cooperatively sealed to the end closure along the periphery of the aperture. This patent application constitutes a continuation-in-part of copending patent application Ser No. 06/909300, filed 09/19/86, both applications being assigned to common assignee, Emerson Electric Company, 8000 West Florissant, P. O. Box 4000, St. Louis, Mo. 63136.

As discussed in the parent application, it is well known in the art to place an apertured cover in a fixture, the fixture further supporting in the cover aperture a terminal pin surrounded by an annular bead of glass or glass sinter extending from the pin to the aperture wall, the loaded fixture being heated to the melting point of the glass to bond the glass to the cover and to the pin. More recently, to reduce space, time and energy requirements and to avoid cumbersome manufacturing techniques, a universal seal has been provided in the form of a pin carrying eyelet which can be readily oriented in either of two positions in sealing relation with the aperture of the cover for efficient and economical assembly and welding.

The present invention provides an improved end closure structure for the chamber defining housing of an hermetic terminal assembly and an improved method of making the same which employs certain features of the parent application in a modified form to even further increase the advantages of reducing space, time, material and energy requirements, avoiding cumbersome manufacturing steps, improving the joining of a pin carrying sealing member such as an eyelet to the cover, and even further increasing both the strength of the jointure and the structural support and assured positioning of the terminal pin relative the cover to which it is assembled. As in the parent application, the present invention provides a structure particularly suited for use with thinner covers, even further contributing to overall size and weight reduction of the hermetic terminal assembly and further increasing overall strength and terminal pin support. The present invention provides a compact, comparatively light and strong assembly structure that also is particularly suited for lithium type batteries.

Various other features of the present invention will become apparent to one skilled in the art upon reading the disclosure set forth herein.

SUMMARY OF THE INVENTION

More particularly, the present invention provides a terminal pin and end closure structure for a chamber defining housing of an hermetic terminal assembly comprising: an end closure for the chamber defining housing including a main body having opposed surfaces with an aperture therethrough, the aperture having an extended peripheral wall preselectively positioned to extend toward the housing chamber when the end closure is assembled therewith, the peripheral wall surrounding the aperture and extending at a preselected angle to the main body for a preselected distance; an eyelet geometrically sized to conform with and overlap the free end of the extended wall in cooperative sealed relation therewith to cover the aperture, the eyelet having opposed faces with an aperature disposed therethrough; and, a terminal pin sealed in the aperture of the eyelet to extend beyond the opposed faces of the eyelet. In addition, the present invention provides a novel method of manufacturing an end closure for a chamber defining housing of an hermetic terminal assembly comprising: forming an end closure with a main body including offset inner and outer sections with the outer section having a peripheral rim extending therefrom and the plane of the inner section falling intermediate the extremities of the peripheral rim; forming an aperture in the inner section of the end closure with an integral peripheral surrounding wall adjacent the aperture and extending toward the plane of the outer section; positioning a sealing means including a terminal extending in sealed relation therethrough so that the sealing means covers the aperture in the inner section of the main body of the end closure with the peripheral edge face of the sealing means in cooperative abutting relation to the peripheral surrounding wall extending from the inner section; and joining the peripheral edge face of the sealing means to the peripheral wall to form a uniform sealed relation therewith.

It is to be understood that various changes can be made by one skilled in the art in the several parts of the structural assembly and in the several steps of the method disclosed herein without departing from the scope or spirit of the present invention.

BRIEF DESCRIPTION OF THE DRAWINGS

Referring to the drawing which discloses an advantageous embodiment of the present invention.

DETAILED DESCRIPTION OF THE INVENTION

Figure 2:
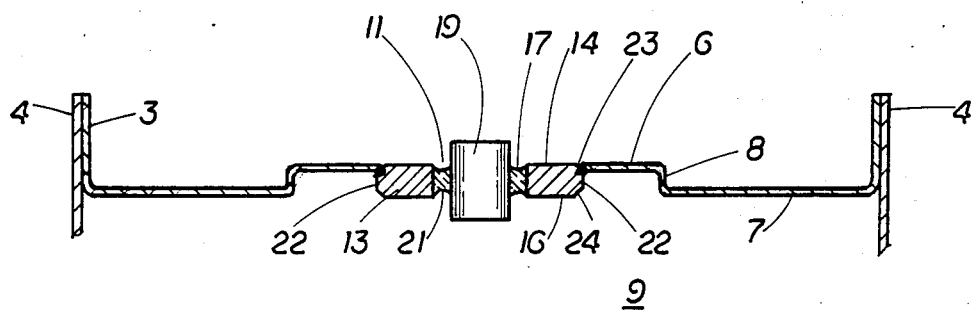
FIG. 2 is an enlarged cross-sectional view of the end closure structure of FIG. 1, taken in a plane through line 2—2 of FIG. 1, disclosing a portion of the hermetic terminal assembly housing; and, FIG. 3 is a further enlarged cross-sectional view of a portion of the structure of FIG. 2, disclosing details of the end closure and eyelet prior to welding.

As can be seen in the drawing, the novel end closure 2 includes a circular main body 2 having a peripheral rim 3 extending normally from the main body thereof, rim 3 being sized and geometrically configured to conform with the inner face of cylindrical chamber defining housing 4 to snugly fit thereagainst and to be sealed thereto. As can be seen in FIG. 2, the peripheral rim 3 is so positioned in housing 4 that the outer extremity of peripheral rim 3 conforms with the outer extremity of chamber defining housing 4. When rim 3 has been properly positioned in housing 4, it can be sealed thereto by any one of a number of suitable sealing means depending upon the materials involved, such as by laser or TIG (tungsten inert gas) welding when the materials are fusible metals.

Figure 1:
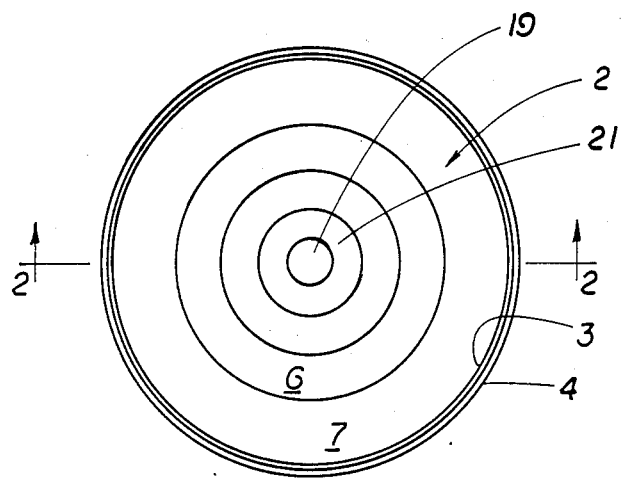
FIG. 1 is a plan view of the novel apertured end closure structure for a chamber defining housing of an hermetic terminal assembly.
Figure 3:
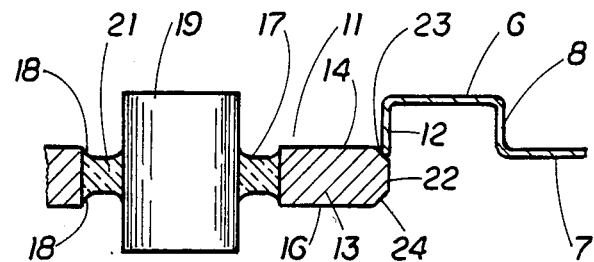

As can be seen in FIGS. 2 and 3 of the drawing, the main body of end closure 2 includes substantially parallel integral offset radially inner section 6 and radially outer section 7 joined by connecting wall 8 integral therewith so that, when end closure 2 is assembled with housing 4, the inner section 6 is spaced from chamber 9 defined by housing 4 a greater distance than outer section 7, the offset further serving to enhance the strength and stability of the end closure. Inner section 6 is provided with an aperture 11 therethrough and an extended peripheral wall 12 surrounding aperture 11 to extend substantially normal thereto toward outer section 7 and housing chamber 9 when end closure 2 is assembled to housing 4. In accordance with the present invention, end closure 2 is formed from a suitable fusible stock material and, when the end closure is to be for lithium type battery assemblies, advantageously is formed from a suitable thin metallic material such as stainless steel strip stock, designated commercially as 304L SS having a thickness of approximately 0.010±0.001 inches.

Sized to conform with and overlap the free end of extended wall 12 in cooperative sealed relation therewith to cover aperture 11 is eyelet 13. Eyelet 13, like end closure 2, can be formed from a suitable fusible material companionable with the fusible material of end closure 2 and in lithium type battery assemblies advantageously is of the same steel stock as end closure 2. Eyelet 13 has substantially flat, parallel surfaces 14 and 16, is circular and is sized to conform with and cover aperture 11 in end closure 2. Eyelet 13 has a central aperture 17 defined by an inner cylindrical wall 18 to which a terminal pin 19, extending substantially normal to surfaces 14 and 16, is bonded by means of a suitable seal 21, which can be of a preselected glass formulation. The outer margins of eyelet 13 are defined by an outer wall 22, perpendicular to parallel planar eyelet surfaces 14 and 16 and chamfered perimetric edge faces 23 and 24, extending at mirror-image angles from the opposite perimetric edges of outer wall 23 to eyelet surfaces 14 and 16 respectively. As in the parent application, the angles of the chamfered faces can be identical and the chamfers symmetrical on either planar surface. It is to be noted that chamfered edge face 23 abuts against the inner free edge of peripheral wall 12, it being understood that it would also be possible to have chamfered edge face 24 so abutting the inner free edge of peripheral wall 12, the abutment, in either case, forming a line contact between the chamfered edge face and the peripheral wall edge.

It is to be noted that in accordance with the present invention, the distance between outer planar surfaces or faces 14 and 16 of eyelet 13 or the thickness thereof is substantially equal to the offset distance between inner section 6 and outer section 7 of the main body of end closure 2 or the breadth of connecting wall 8. Thus, when most of peripheral wall 12 is fused as part of the seal, eyelet surface or face 16 lies substantially in the same plane as outer section 7 of the main body of end closure 2 to enhance compactness of the assembly. It is further to be noted that terminal pin 19 sealed in aperture 17 of eyelet 13 and extending normally beyond faces 14 and 16 thereof is so sized that one extremity of pin 19 extends between the outer surface of inner section 6 of the main body of end closure 2 and the extremity of housing 4 when the end closure is assembled therewith. Thus, not only is compactness enhanced, but the pin 19 does not interfere if the housing is rested on such extremity.

In manufacture of the end closure structure above-described, the main body portion of end closure 2 can be formed by some suitable means such as stamping and punching in a manner similar to that described in the parent application only in this structure the formation is such that the main body includes offset inner section 6 and outer section 7, the outer section having peripheral rim 3 and the inner section having aperture 11 with an integral peripheral wall 12 surrounding aperture 11. It is to be understood that other forming steps besides stamping and punching could be employed to arrive at the desired shaped end closure, depending upon the nature of the materials employed. For example, with certain fusible materials, such as plastics, it would be possible to cast or extrude much of the desired shape. Once the end closure 2 has been properly formed, a sealing means, which can be in the form of aforedescribed eyelet 13, including terminal pin 19 extending in sealed relation there-through, is positioned so that the sealing means covers the aperture in the inner section 6 of the main body of end closure 2 with the peripheral edge face of the sealing means in cooperative abutting relation to the peripheral surrounding wall 12 extending from inner section 6. With the sealing means properly positioned, the peripheral edge face thereof is then joined to the peripheral surrounding wall 12 to form a uniform sealed relation therewith by some suitable sealing step such as fusion resistance, laser nertial welding in a manner similar to that described in the parent application.

From the description set forth above, it is to be understood that, although the present invention lends itself to the effective utilization of very thin end closure structure arranged in a unique compact yet strong manner to resist outward pressures from within a housing chamber, the overall size and overall geometry of the closure is otherwise immaterial as long as the closure aperture and peripheral wall are sized to permit the sealing member, such as an eyelet, to be securely joined as described, and the relative dimensions of the eyelet thickness and offset of inner and outer sections as well as the terminal pin are such as to permit the desired inventive compactness and facility of handling. As above noted, the end closure and eyelet advantageously can be made of compatible stainless steel but other type metals or conceivably even fusible plastics can be employed. Numerous other variations in construction of the end closure and eyelet structure and in the method of assembly will occur to those skilled in the art in view of the disclosure herein without departing from the scope or spirit of this invention.

The invention claimed is:

1. A terminal pin and end closure structure for a chamber defining housing of an hermetic terminal assembly comprising:

an end closure for said chamber defining housing including a main body having opposed surfaces with an aperture therethrough, said aperture having an extended peripheral wall preselectively positioned to extend toward said housing chamber when said end closure is assembled therewith, said peripheral wall surrounding said aperture and extending at a preselected angle to said main body for a preselected distance with the extremity of said extended peripheral wall portion presenting inner and outer edges;

an eyelet geometrically sized to conform with the overlap the entirety of said inner edge of said extending peripheral wall in cooperative sealed relation therewith to totally cover said aperture, said eyelet having opposed faces with an aperture disposed therethrough; and, a terminal pin sealed in said aperture of said eyelet to extend beyond said opposed faces of said eyelet.

2. The terminal pin and end closure structure of claim 1, said peripheral wall extending normal to said main body.

3. The terminal pin and end closure structure of claim 1, said eyelet having a chamfered peripheral edge adjacent at least that face thereof in sealed relation with said extended wall, said chamfered edge abutting said inner edge of said extended peripheral wall to be sealed thereto.

4. The terminal pin and end closure structure of claim 1, said terminal pin extending normal to said main body of said end closure.

5. The terminal pin and end closure structure of claim 1, said end closure and said eyelet being of fusible material to provide a fused sealed relationship therewith.

6. The terminal pin and end closure structure of claim 1, said end closure and said eyelet being of fusible metallic material to provide a fuse welded sealed relationship therebetween.

7. The terminal pin and end closure structure of claim 1, said end closure main body including a peripheral rim extending normally therefrom and geometrically conforming with the inner face of said housing to snugly fit thereagainst to be sealed thereto, said rim and said terminal pin being so sized and positioned that one extremity of said pin extends between the outer surface of said main body of said end closure and the housing extremity.

8. The terminal pin and end closure structure of claim 1, said end closure main body including parallel offset radially inner and outer sections with said inner section having said eyelet covered aperture therein spaced from the chamber of said chamber defining housing a greater distance that said outer section.

9. The terminal pin and end closure structure of claim 8, said offset difference in spacing from said chamber with respect to said inner and outer sections being equal to the thickness of said eyelet sealed to and covering said aperture in said inner section.

10. A terminal pin and end closure structure for a chamber defining housing of an hermetic terminal assembly comprising:

a fusible metalic end closure having a main body portion including a peripheral rim extending normally therefrom and geometrically conforming with the inner face of said housing to snugly fit thereagainst to be sealed thereto with the outer extremity of said rim conforming with the outer extremity of said housing, said end closure main body portion including parallel integral offset radially inner and outer sections with said inner section being spaced from the chamber of said housing a greater distance than said outer section and having an aperture therethrough, said aperture having an extended peripheral wall surrounding said aperture to extend normal thereto and toward said housing chamber when said end closure is assembled therewith with the extremity of said peripheral wall presenting inner and outer edges;

an eyelet geometrically sized to conform with the overlap the entirety of said inner edge of said extended peripheral wall in cooperative sealed relation therewith to totally cover said aperture, said eyelet having a chamfered peripheral edge adjacent at least that face thereof in sealed relation with said extended peripheral wall portion, said chamfered edge abutting said inner edge of said extended peripheral wall portion to be sealed thereto, said eyelet having opposed faces with an aperture disposed therethrough and having a thickness between said opposed faces equal to the offset distance between said inner and outer sections of said main body portion of said end closure; and, a terminal pin sealed in said aperture of said eyelet to extend normal to and beyond said opposed faces of said eyelet, said terminal pin being so sized that one extremity of said pin extends between the outer surface of said inner section of said main body of said end closure and said housing extremity.

* * * * *